United States Patent
Horiike et al.

(10) Patent No.: US 10,044,911 B2
(45) Date of Patent: Aug. 7, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Norikazu Horiike, Tokyo (JP); Kenichiro Uotani, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 24 days.

(21) Appl. No.: 15/279,076

(22) Filed: Sep. 28, 2016

(65) Prior Publication Data

US 2017/0111552 A1    Apr. 20, 2017

(30) Foreign Application Priority Data

Oct. 14, 2015  (JP) .................................. 2015-202888

(51) Int. Cl.
*H04N 1/60* (2006.01)
*H04N 17/00* (2006.01)

(52) U.S. Cl.
CPC ............ *H04N 1/6077* (2013.01); *H04N 1/60* (2013.01); *H04N 1/6008* (2013.01); *H04N 1/6027* (2013.01)

(58) Field of Classification Search
None
See application file for complete search history.

(56) References Cited

U.S. PATENT DOCUMENTS

| 5,185,666 | A | * | 2/1993 | Capitant | H04N 1/6011 348/187 |
| 5,414,531 | A | * | 5/1995 | Amemiya | G03G 15/01 358/465 |
| 5,493,415 | A | * | 2/1996 | Mita | G06T 1/20 358/444 |
| 5,606,432 | A | * | 2/1997 | Ohtsuka | H04N 1/6011 358/501 |
| 5,609,978 | A | * | 3/1997 | Giorgianni | G03C 7/3041 358/505 |
| 5,675,717 | A | * | 10/1997 | Yamamoto | G06K 15/00 358/1.9 |

(Continued)

FOREIGN PATENT DOCUMENTS

JP        3490545        1/2004

*Primary Examiner* — Madelein Nguyen
(74) *Attorney, Agent, or Firm* — Fitzpatrick, Cella, Harper & Scinto

(57) ABSTRACT

An image processing apparatus according to an embodiment of the present invention performs a first correction for an image based on a correction value corresponding to a step designated by an operator among a plurality of steps corresponding to a plurality of correction values used for correcting the image. The image processing apparatus stores information used for specifying a change amount of a correction value corresponding to a change of one step of the plurality of steps in a memory. The change amount can be changed, and the change amount at the time of operator's designating the step is stored. The image processing apparatus performs a second correction for the image based on the change amount of the correction value corresponding to the change of the one step that is specified by the information stored in the memory.

20 Claims, 17 Drawing Sheets

(56) References Cited

U.S. PATENT DOCUMENTS

| | | | | |
|---|---|---|---|---|
| 5,748,342 A | * | 5/1998 | Usami | H04N 1/6011 358/500 |
| 5,748,858 A | * | 5/1998 | Ohtsuka | H04N 1/6011 358/1.9 |
| 5,822,040 A | | 10/1998 | Sugahara et al. | 355/38 |
| 5,847,848 A | * | 12/1998 | Suzuki | H04N 1/6011 358/500 |
| 5,852,674 A | * | 12/1998 | Takahashi | G06T 11/60 358/527 |
| 5,864,634 A | * | 1/1999 | Kurita | G06T 11/001 358/523 |
| 5,875,035 A | * | 2/1999 | Motosugi | H04N 1/3877 358/296 |
| 5,933,257 A | * | 8/1999 | Kurita | H04N 1/6011 358/527 |
| 5,987,220 A | * | 11/1999 | Terajima | H04N 1/6033 358/1.9 |
| 6,020,976 A | * | 2/2000 | Fujita | B41J 3/543 347/3 |
| 6,198,553 B1 | * | 3/2001 | Yamamoto | H04N 1/6011 358/519 |
| 6,826,290 B1 | * | 11/2004 | Murakami | G06T 1/0028 380/201 |
| 7,221,464 B2 | * | 5/2007 | Yamano | B41J 2/205 347/112 |
| 7,239,412 B2 | * | 7/2007 | Leslie | G06K 15/00 358/1.15 |
| 7,698,471 B2 | * | 4/2010 | Aoki | G06F 3/1204 358/1.15 |
| 7,796,296 B2 | * | 9/2010 | Martinez | H04N 1/6011 358/1.9 |
| 8,243,326 B2 | * | 8/2012 | Olson | H04N 1/6011 358/1.9 |
| 8,411,101 B2 | * | 4/2013 | Watanabe | G06F 3/1208 345/589 |
| 8,441,682 B2 | * | 5/2013 | Chung | H04N 1/6055 358/1.9 |
| 8,565,534 B2 | * | 10/2013 | Takahashi | G06F 17/30247 358/474 |
| 8,625,177 B2 | * | 1/2014 | Minami | H04N 1/6011 345/590 |
| 8,780,365 B2 | * | 7/2014 | Gerega | G03G 15/5087 358/1.13 |
| 2005/0122533 A1 | * | 6/2005 | Nakagawa | H04N 1/622 358/1.9 |
| 2008/0019611 A1 | * | 1/2008 | Larkin | G06K 9/6203 382/287 |
| 2010/0118338 A1 | * | 5/2010 | Sakiyama | H04N 1/00411 358/1.15 |
| 2011/0267654 A1 | * | 11/2011 | Matsunaga | G03G 15/36 358/3.24 |
| 2012/0081768 A1 | * | 4/2012 | Iguchi | H04N 1/4015 358/518 |

\* cited by examiner

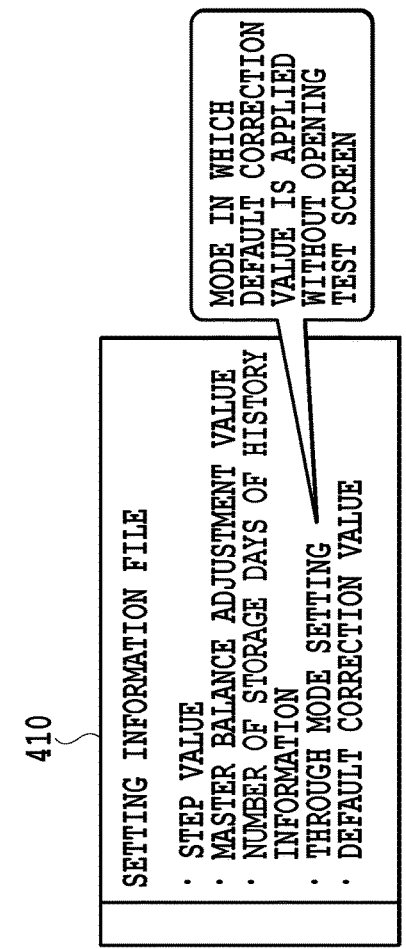

FIG.4B

SETTING INFORMATION FILE
- STEP VALUE
- MASTER BALANCE ADJUSTMENT VALUE
- NUMBER OF STORAGE DAYS OF HISTORY INFORMATION
- THROUGH MODE SETTING
- DEFAULT CORRECTION VALUE

MODE IN WHICH DEFAULT CORRECTION VALUE IS APPLIED WITHOUT OPENING TEST SCREEN

410

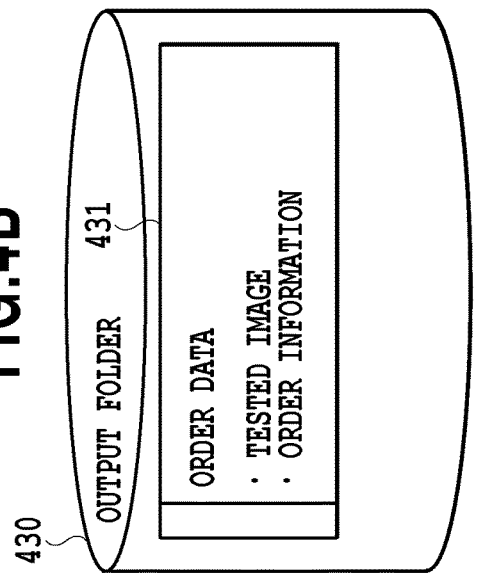

FIG.4D

OUTPUT FOLDER 431
ORDER DATA
- TESTED IMAGE
- ORDER INFORMATION

430

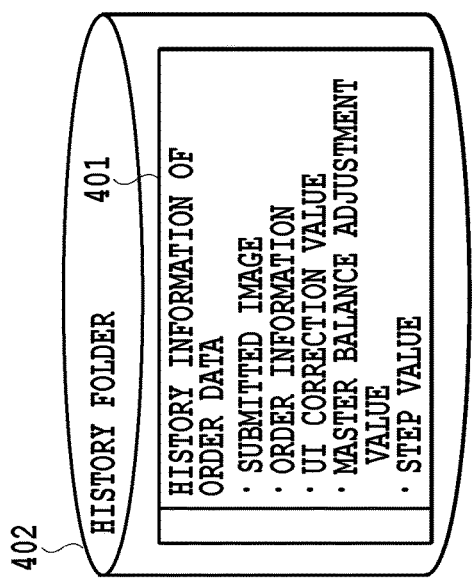

FIG.4A

HISTORY FOLDER 401
HISTORY INFORMATION OF ORDER DATA
- SUBMITTED IMAGE
- ORDER INFORMATION
- UI CORRECTION VALUE
- MASTER BALANCE ADJUSTMENT VALUE
- STEP VALUE

402

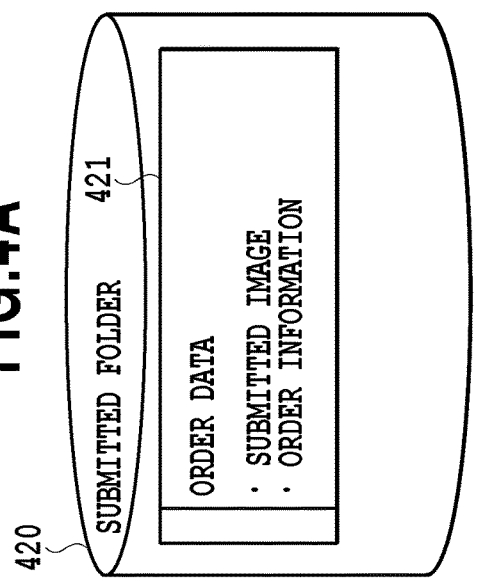

FIG.4C

SUBMITTED FOLDER 421
ORDER DATA
- SUBMITTED IMAGE
- ORDER INFORMATION

420

ORDER RE-ACQUISITION SCREEN — 810

| | ORDER NUMBER | TEST DATE AND TIME OF PREVIOUS TIME |
|---|---|---|
| x | 1001 | 2015/08/20 15:00:24 |
| | 1002 | 2015/08/20 16:10:35 |
| | 1003 | 2015/08/20 08:35:10 |
| | 1004 | 2015/08/30 09:10:12 |
| | 1005 | 2015/08/31 12:50:00 |
| | 1006 | 2015/09/08 13:40:10 |
| | 1007 | 2015/09/08 13:40:10 |

801, 805, 802

[ ACQUISITION ] 803   [ CANCEL ] 804

ORDER LIST SCREEN

| | STATE | ORDER NUMBER | NUMBER OF IMAGES |
|---|---|---|---|
| ● 901 | TEST STANDBY | 1001 | 96 |
| | TEST STANDBY | 0002 | 10 |
| | COMPLETED | 0003 | 6 |
| | COMPLETED | 3001 | 6 |
| | COMPLETED | 1020 | 6 |
| | COMPLETED | 2005 | 6 |

FIG.9

IMAGE PROCESSING APPARATUS, IMAGE PROCESSING METHOD, AND STORAGE MEDIUM

BACKGROUND OF THE INVENTION

Field of the Invention

The present invention relates to an image testing technology.

Description of the Related Art

Hitherto, when an image is printed, in order to acquire an appropriate print result, an operator performs an image test (see Japanese Patent No. 3490545). The image test is displaying a test target image on a monitor and operator's checking whether a density, color balance, and the like of the image are appropriate for print through a visual observation. For an image having no appropriate density and no appropriate color balance, the operator corrects the image so as to have an appropriate density and appropriate color balance while checking a displayed image through a visual observation.

The adjustment of the density and the color balance is performed by adjusting the value of one of CMYD (cyan, magenta, yellow, and density) which are setting values that can be adjusted by an operator on a test screen. For example, an operation of having the value of C (cyan) "+1" or "−1" from a current setting is performed by an operator. Hereinafter, in this series of test operations, the values of CMYD that are adjusted on the test screen so as to be set by the operator for an image will be referred to as "UI correction values". An image processing unit correcting an image performs image processing based on values called "system correction values" instead of performing the image processing by directly using the UI correction values. The "UI correction values" are elements used for determining the "system correction values".

The system correction values are determined using the following Equation (1).

$$\text{System correction value} = \text{UI correction value} \times \text{Step value} + \text{Master balance adjustment value} \quad (1)$$

Here, the step value is a change amount of an actual color correction value corresponding to a case where "1" is set as the UI correction value. The description of the system correction value will be supplemented with reference to FIG. 1. FIG. 1 illustrates a case where a value of ±15 can be set as an UI correction value. In a case where the UI correction value is added by "+1", a value corresponding to a step value becomes a correction amount. In a case where the step value is increased, the correction amount is increased. The master balance adjustment value, as illustrated in FIG. 1, designates a base point of a correctable range.

While the UI correction value is set by the operator for each test target image, the step value and the master balance adjustment value are set in advance in a system that performs the test. Hereinafter, the step value and the master balance adjustment value will be referred to as "color environment settings". An actual correction value (system correction value) is determined based on the UI correction value adjusted by the operator on a test screen in this way and the color environment settings that are specifically set in the system.

In such a test system, image data to be printed is included in order data input from a customer. The test operation described above is performed for such an image. Here, there are use cases where order data that has already been tests is desired to be tested again (hereinafter, referred to as a "retest"). At the time of performing a retest, an image that has been tested in the previous time is reproduced on the monitor, and an adjustment is performed again.

However, when a color environment setting that is a setting specific to the system is changed, in a case where order data that has been tested before the change in the color environment setting is retested, the same color tone as that of the order data that has been previously tested may not be reproduced. The reason for this is that, even in a case where the UI correction value is the same at the time of a first test and at the time of a retest, from the relation represented in Equation (1), when the color environment settings are changed, as described above, the actual correction value (system correction value) is changed. Accordingly, in a case where the retest is performed, the color environment settings at the time of the previous test need to be reflected.

SUMMARY OF THE INVENTION

According to the present invention, there is provided a non-transitory computer readable storage medium storing a program for causing a computer to perform an image processing method. The image processing method includes: a first correction process for performing a first correction for an image based on a correction value corresponding to a step designated by an operator among a plurality of steps corresponding to a plurality of correction values used for correcting the image; a storage process for storing information used for specifying a change amount of a correction value corresponding to a change of one step of the plurality of steps in a memory, wherein the change amount can be changed, and the change amount at the time of operator's designating the step at the first correction process is stored; and a second correction process for performing a second correction for the image based on the change amount of the correction value corresponding to the change of the one step that is specified by the information stored in the memory at the storage process.

Further features of the present invention will become apparent from the following description of exemplary embodiments (with reference to the attached drawings).

BRIEF DESCRIPTION OF THE DRAWINGS

FIG. 4A is a diagram that illustrates an example of a history folder used in the description of Embodiment 1;

FIG. 4B is a diagram that illustrates an example of a setting information file used in the description of Embodiment 1;

FIG. 4C is a diagram that illustrates an example of a submission folder used in the description of Embodiment 1;

FIG. 4D is a diagram that illustrates an example of an output folder used in the description of Embodiment 1;

FIG. 8 is a diagram that illustrates an example of an order re-acquisition screen used in the description of Embodiment 1;

FIG. 9 is a diagram that illustrates an example of an order list screen used in the description of Embodiment 1;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

Before embodiments are described, use cases in which a retest is necessary will be described as a supplement. For example, a scene in which, for a previous test performed by an inexperienced operator A, an experienced operator B performs a retest may be assumed. In addition, a case where a retest is performed according to a request from a customer may be assumed as well.

There are cases where color environment settings that are settings specific to a system described above are changed between a previous test and a current retest as described above. For example, there is a case where an order for a large quantity of graduation albums is accepted in order data at a graduation season. In this way, in a case where order data of a similar tendency is accepted in a large quantity, a case may be considered in which the color environment settings are changed as well in the order data. Then, in a case where a test performed before the change in the color environment settings is re-performed after the change in the color environment settings, an operation of returning the color environment settings to the original settings once is necessary. Since the color environment settings are set to be specific to the system as described above, a complicated operation of restarting an apparatus in accordance with the change in the color environment settings is necessary as well.

In embodiments described below, at the time of a retest, the retest is performed using the color environment settings used at the time of the previous test without performing an operation of returning the color environment settings to the original settings.

Embodiment 1

Figure 1:
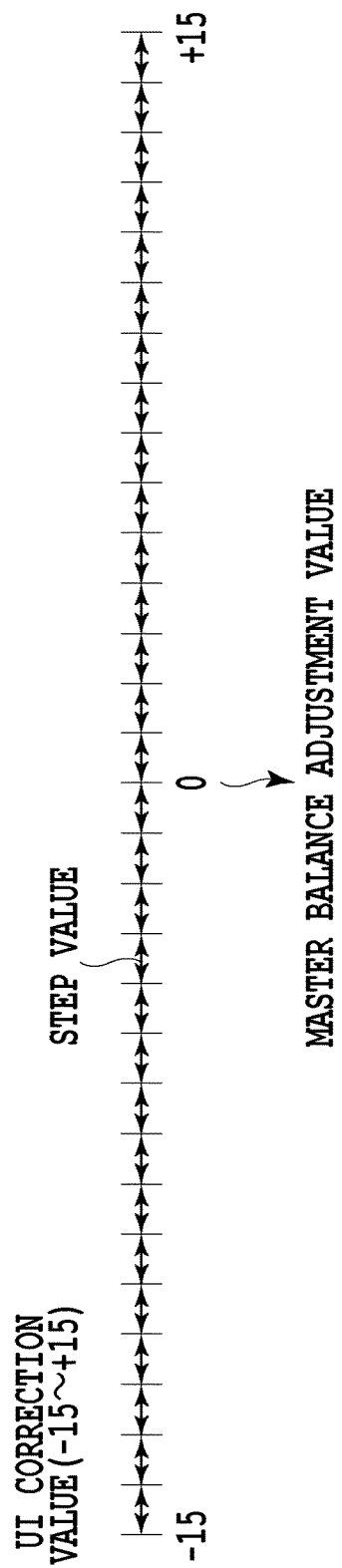
FIG. 1 is a diagram that illustrates an example of a system correction value used in description of Embodiment 1.
Figure 2:
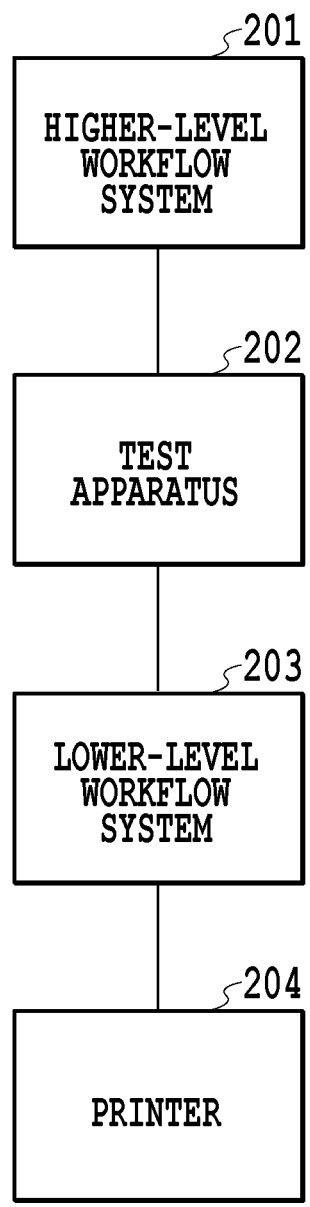
FIG. 2 is a block diagram that illustrates the whole configuration of a test system used in the description of Embodiment 1.

FIG. 2 is a block diagram that illustrates the whole configuration of a test system that performs a series of processes including a test. Order data is submitted from a higher-level workflow system 201 to a test apparatus 202 through a LAN. The order data tested by the test apparatus is output to a lower-level workflow system 203 through a LAN. The lower-level workflow system 203 transmits a print job to a printer 204. The printer 204 prints the order data.

Figure 3:
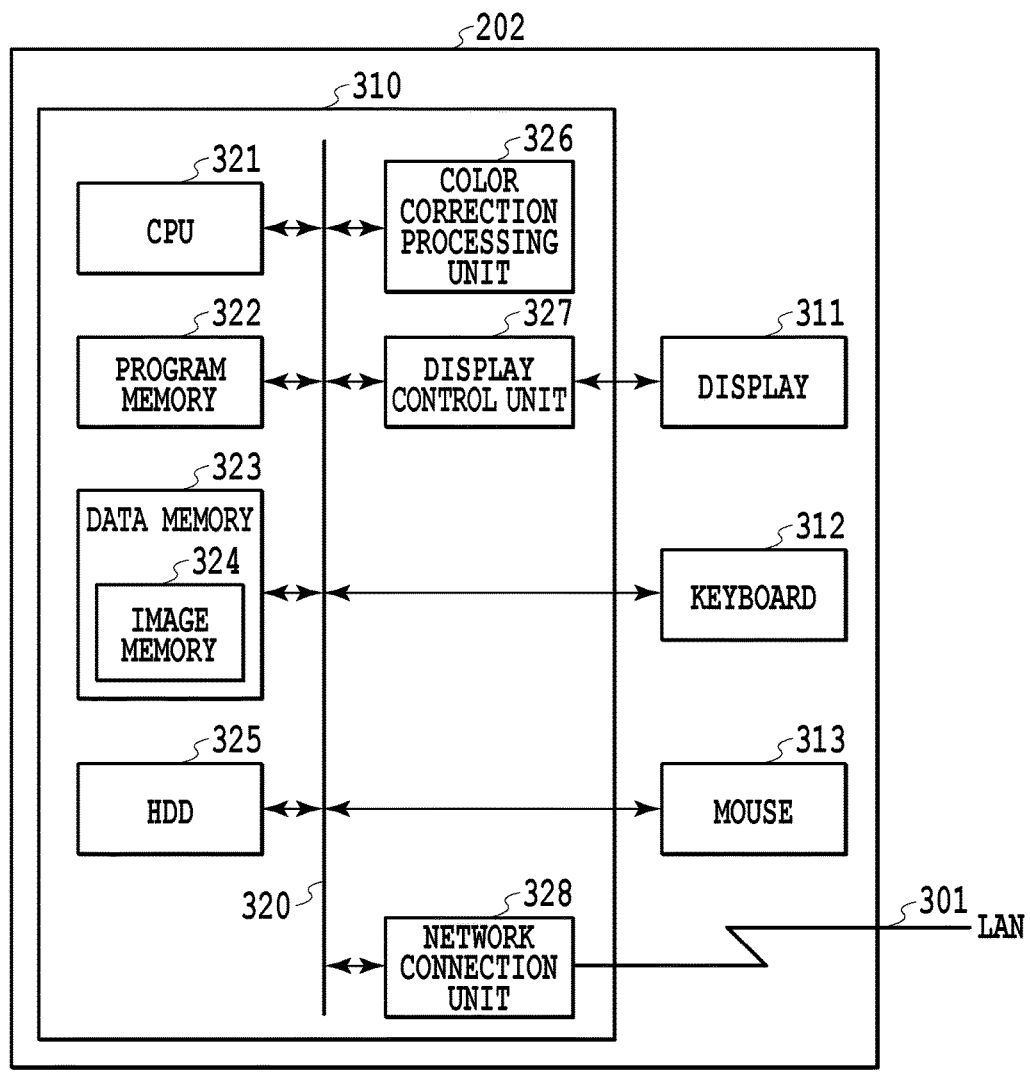
FIG. 3 is a block diagram that illustrates the configuration of a test apparatus used in the description of Embodiment 1.

FIG. 3 is a block diagram that illustrates the configuration of the test apparatus 202. The test apparatus 202 includes: a PC 310 that controls the whole apparatus; a display 311; a keyboard 312; and a mouse 313.

Here, the PC 310 operates according to a control program stored in a program memory 322 that is in the form of a ROM connected through an internal bus 320 and a content of a data memory 323 that is in the form of a RAM. The CPU 321 accepts order data, which is submitted through the LAN 301, through a network connection unit 328.

The CPU 321 displays an UI such as an order list screen 910, a test screen 520, or an order re-acquisition screen 810 to be described later on a display 311 by controlling a display control unit 327. In addition, the CPU 321 accepts a user operation through a keyboard 312 and a mouse 313.

An HDD 325 stores data to be desired to be stored also after completion of the process in the test apparatus. Examples of such data include a history folder 402 as illustrated in FIG. 4A, a setting information file 410 as illustrated in FIG. 4B, and an initial setting file for setting the operation of the test apparatus.

A history folder 402 stores history information 401 of order data for each order data. The history information 401 includes image data representing a submitted image and order information representing an order number identifying an order, an order quantity, order date and time, and the like. In addition, the history information 401 includes a UI correction value, a master balance adjustment value, a step value, and the like applied to the order data. In this embodiment, since the history information 401 includes the UI correction value, the master balance adjustment value, the step value, and the like, a system correction value applied to the order data can be calculated for each order data.

A setting information file 410 includes settings that are common to the test apparatus. In other words, the setting information file 410 includes the step value and the master balance adjustment value applied to the current test apparatus. In addition, the setting information file 410 includes information representing the number of storage days for which the history information is stored. Furthermore, the setting information file 410 includes a through-mode setting and default correction value. The through-mode setting is a setting of an operation mode in which a color correction process is automatically performed based on a default correction value without operator's performing a test through a UI screen. The default correction value is a correction value (system correction value) applied to a case where a correction is performed without displaying a test screen to be described later.

The color correction processing unit 326 corrects a color tone of image data stored in an image memory 324. The color correction processing unit 326 performs a color correcting process for the order data. At this time, the color correction processing unit 326, as described above, performs a correction according to the system correction value for a submitted image included in the order data as described above. The system correction value, as described above, is a value based on the UI correction value set by an operator through the UI screen, the master balance adjustment value that is a value common to the test apparatus, and the step value. The color correction processing unit 326 according to this embodiment performs switching of the master balance adjustment value and the step value to be used based on whether or not the order data is retest target order data. In other words, switching is performed between the use of a master balance adjustment value and a step value included in the history information and the use of a master balance adjustment value and a step value included in the setting information file 410 that is a current setting. Details thereof will be described later.

FIG. 4C illustrates a submission folder 420, and FIG. 4D illustrates an output folder 430. The submission folder 420 stores order data 421 that is a test target. The order data 421 includes image data representing a submitted image and order information. The output folder 430 stores test-processed order data 431. The order data 431 includes image data representing a tested image and order information. The submission folder 420 may be stored either in the higher-level workflow system 201 or in the HDD 325 of the test apparatus 202. In addition, the output folder 430 may be stored either in the lower-level workflow system 203 or in the HDD 325 of the test apparatus 202.

Figure 5:
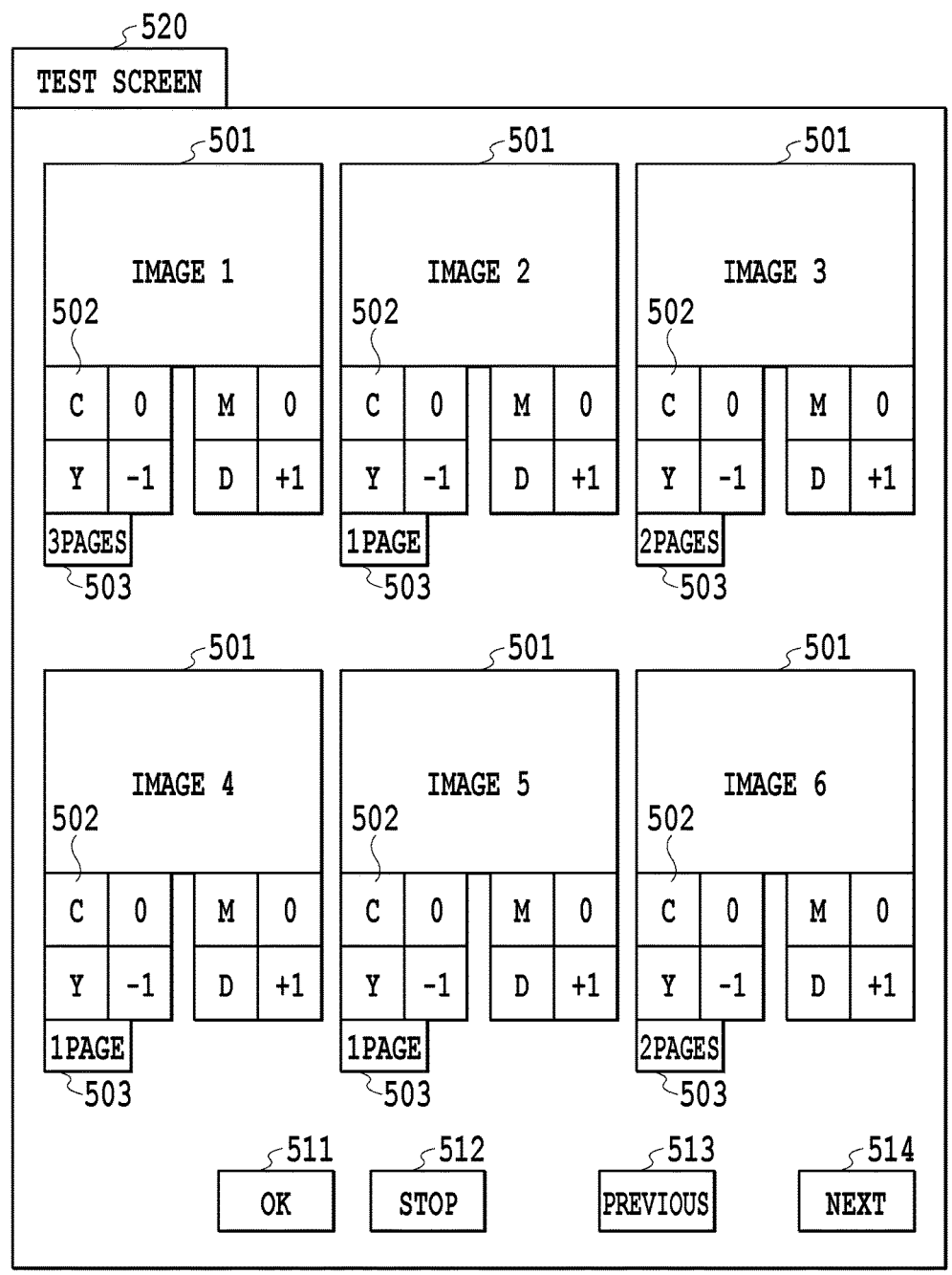
FIG. 5 is a diagram that illustrates an example of a test screen used in the description of Embodiment 1.

FIG. 5 illustrates an example of the test screen displayed on the display 311 by the CPU 321 controlling the display control unit 327. The test screen displays submission images included in the order data 421. A test screen 520 illustrated in FIG. 5 simultaneously represents six images as images 501 to be tested among submission images included in the order data 421. In a case where the number of the submission images is more than six, by receiving an input of a button 514 used for displaying the next six images on the test screen 520 or a button 513 used for displaying previous six images, the CPU 321 displays corresponding images on the display 311. In other words, in the example illustrated in FIG. 5, an example is represented in which six images are tested on one screen. This is an example, and the number of images displayed on the test screen 520 may be an arbitrary number.

The test screen 520 includes setting buttons 502 used for inputting the levels of color corrections for each of images 1 to 6. There are a plurality of kinds of color correction, and, for example, as illustrated in FIG. 5, CMYD of cyan (C), magenta (M), yellow (Y), and density (D) can be individually adjusted. A value set to the setting button 502 is the UI correction value described above. For example, when an operator changes the UI correction value of the image 1 by using the setting button 502, the color correction processing unit 326 performs a color correcting process using a system correction value determined based on the UI correction value after the change, and an image after the correction is displayed in a region of the image 1 of the test screen 520. In this way, the operator can appropriately perform an operation of a color correction while checking the test screen 520. As illustrated in FIG. 5, the UI correction value, for example, is designated using a relative value such as +1 or −2. This relative value is a relative value from a master balance adjustment value. In addition, an absolute value indicated by this relative value is changed in accordance with a step value as described above.

The test screen 520 also includes other information. For example, the number of pages 503 for each image is displayed based on order information included in order data. In a case where a test operation for one piece of order data ends, the operator clicks an OK button 511. When operator's click input of the OK button 511 is received, the CPU 321 stores the history information 401 as illustrated in FIG. 4B for corresponding order data in the history folder 402. In a case where the test operation is to be stopped, the operator clicks a stop button 512.

Figure 6:
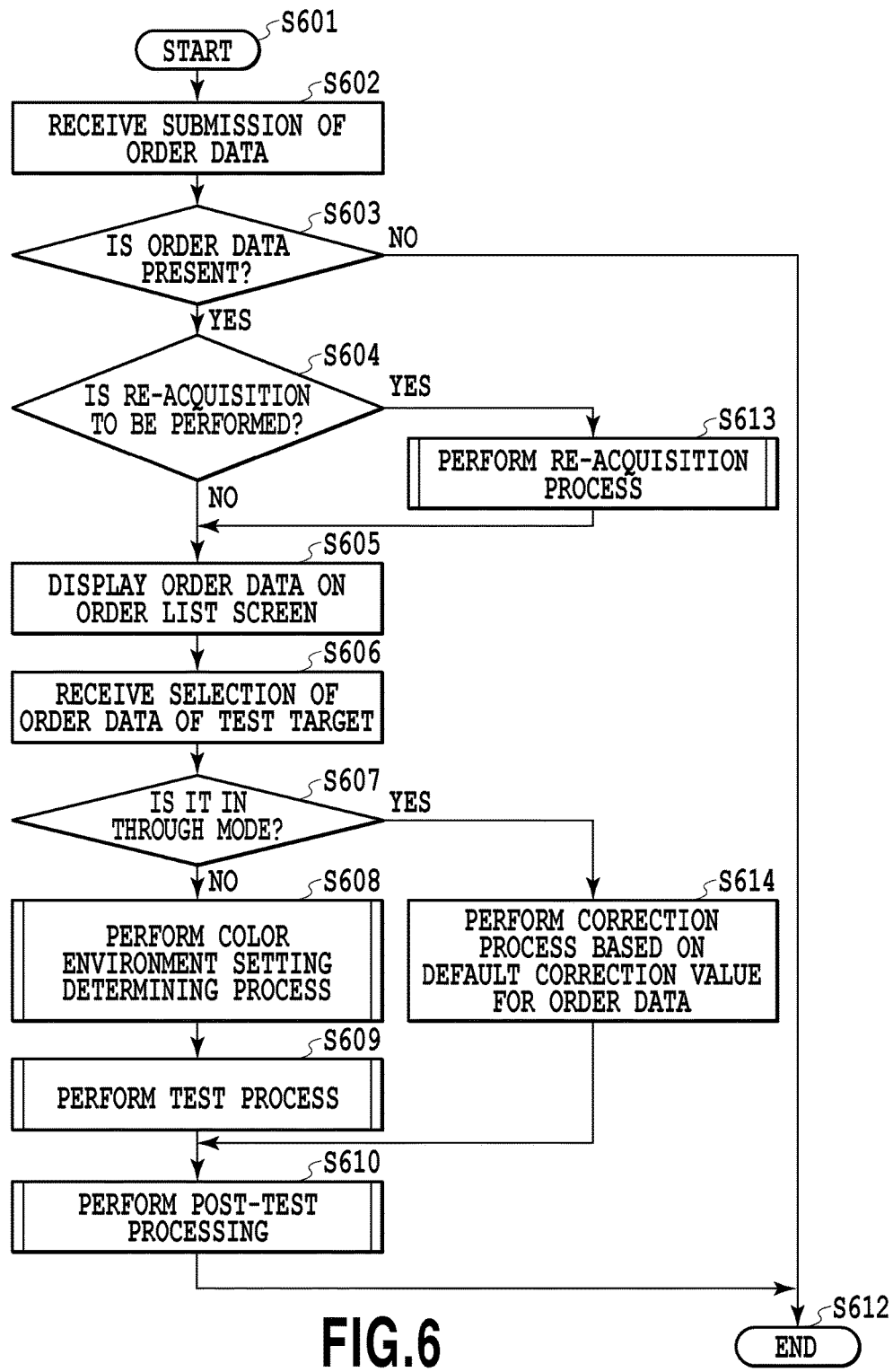
FIG. 6 is a flowchart of a test process used in the description of Embodiment 1.

FIG. 6 is a flowchart of the test process. The process illustrated in FIG. 6 is performed as the CPU 321 executes a program stored in the program memory 322. In addition, the CPU 321 controls the color correction processing unit 326, the display control unit 327, and the like in accordance with the program.

At Step S601, the test process is started up. At the time of the startup, the CPU 321 reads the setting information file 410 illustrated in FIG. 4B. In the setting information file 410, information used as an initial state for operating the current test apparatus is included. More specifically, in the setting information file 410, as described with reference to FIG. 4B, a step value, a master balance adjustment value, storage date of history information in units of order data, a default correction value, and a through mode setting are included.

At Step S602, the CPU 321 receives submission of order data 901 to the submission folder 420 of the HDD 325. This order data is received by the test apparatus 202 through the network connection unit 328 from the higher-level workflow system 201 through the LAN 301. At Step S603, the CPU 321 determines presence/absence of order data. As a result of the determination, in a case where the order data is present, the process proceeds to Step S604. On the other hand, in a case where no order data is present, the test process ends at Step S612.

Figure 7:
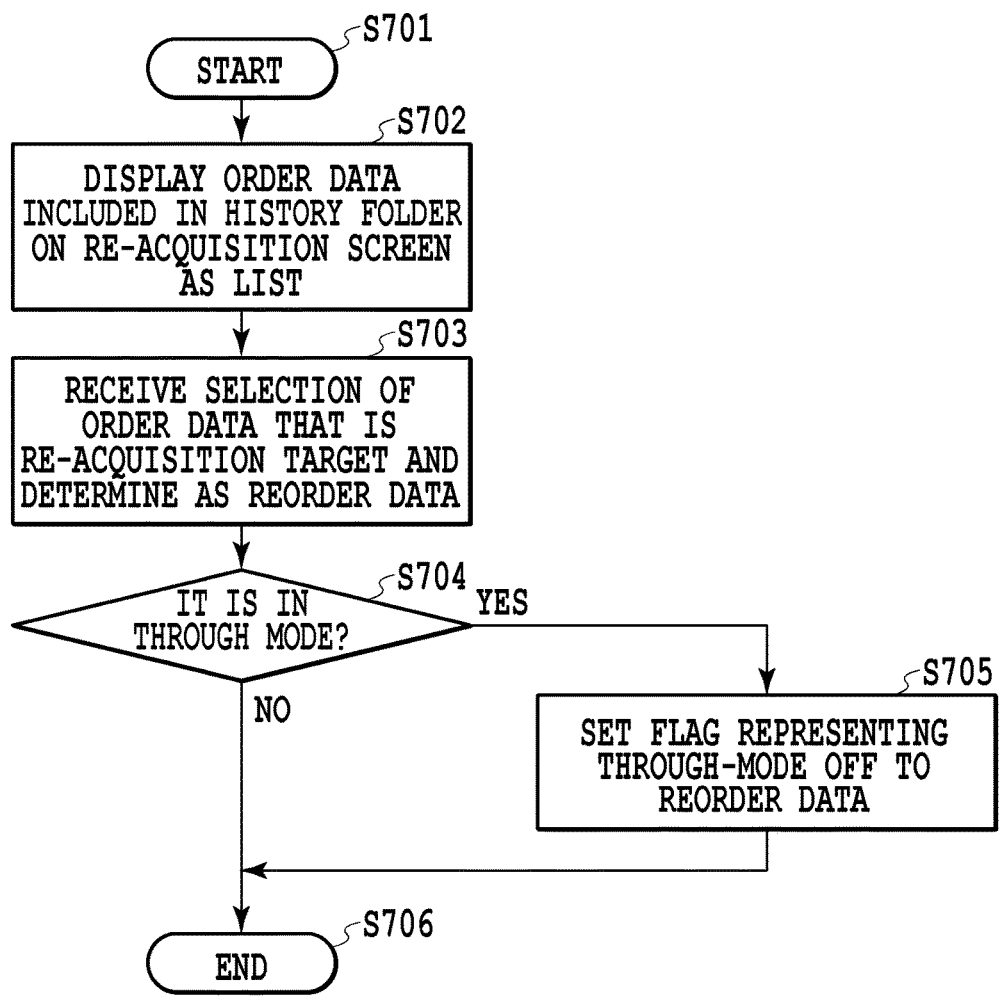
FIG. 7 is a flowchart of a re-acquisition process used in the description of Embodiment 1.

At Step S604, the CPU 321 determines whether or not the order data of which the previous test has been completed is to be acquired again. The CPU 321 displays a UI screen, for example, on the display 311, allows the operator to select whether or not the order data of which the test has already been completed is to be acquired again, and performs a determination based on a result of the selection. In a case where the order data of which the previous test has been completed is acquired again, the process proceeds to Step S613, and the re-acquisition process illustrated in FIG. 7 is performed. On the other hand, in a case where the re-acquisition is not performed, the process proceeds to Step S605.

FIG. 7 is a flowchart of the re-acquisition process of order data. At Step S701, the re-acquisition process is started. At Step S702, the CPU 321 reads the history information 401 of the order data stored in the history folder 402. Then, the CPU 321 displays order information included in the history information 401 of the read order data on an order re-acquisition screen on the display 311 as a list.

FIG. 8 is a diagram that illustrates an example of the order re-acquisition screen 810 displayed at Step S702. On the order re-acquisition screen 810, orders that are candidates for re-acquisition are listed. Here, an order number 801 included in the order information and test date and time 805 at which the previous test has been performed are listed for each order. At Step S703, the CPU 321 receives operator's selecting one or more orders to be re-acquired from the candidates displayed on the order re-acquisition screen 810 and checking a check button 802. In a case where the checked order is determined as a re-acquisition target, the operator clicks an acquisition button 803. When the click of the acquisition button 803 is received, the CPU 321 determines the order of which the check button 802 has been checked as re-acquisition order data (hereinafter, referred to as reorder data). In a case where no order to be re-acquired is present, the operator clicks a cancel button 804. In a case where the click of the cancel button 804 is received, the CPU 321 ends the process illustrated in FIG. 7.

At Step S704, the CPU 321 determines whether the current test apparatus operates in the through mode by referring to the setting information file 410. In a case where the current test apparatus operates in the through mode, the process proceeds to Step S705. On the other hand, in a case where the current test apparatus does not operate in the through mode, the process proceeds to Step S706, and the process illustrated in FIG. 7 ends. At Step S705, the CPU 321 sets such that the reorder data determined at Step S703 is not processes in the through mode. The reason for this will be described next. In the through mode, the test apparatus automatically performs a color correcting process based on the default correction value without displaying a test screen. Accordingly, in a case where the operator wants to test the reorder data, the color tone cannot be changed. In order to prevent this, more specifically, the CPU 321 sets a flag that indicates through-mode Off in the reorder data. Accordingly, even in a case where the current test apparatus is set to operate in the through mode (through-mode On), the CPU 321 can allow the operator to be able to perform a test by handling the reorder data as being through-mode Off by referring to the flag. Then, at Step S706, the process illustrated in FIG. 7 ends.

When the re-acquisition process of Step S613 described in detail with reference to FIG. 7 ends, the process proceeds to Step S605. At Step S605, the CPU 321 displays an order list screen representing the order data on the display 311. FIG. 9 is a diagram that illustrates an example of the order list screen 910. In the order list screen 910, each order data includes: a test process progress status 902, an order number 903 used for identifying order data; and the number of images 904 representing the number of images included in the order data. In addition, a mark 901 identifying that order data is reorder data is also displayed on the order list screen 910. This identification mark 901 is displayed for order data determined as reorder data in the re-acquisition process of Step S613.

Next, at Step S606, the CPU 321 receives operator's selection of order data that is a test target from the order list screen.

Next, at Step S607, the CPU 321 determines whether or not the order data received at Step S606 is to be processed in the through mode. In a case where the through mode setting is Off in the setting information file 410, the CPU 321 determines that the order data is not to be processed in the through mode. In addition, even in a case where the through mode setting is On in the setting information file 410, when the order data is reorder data and has a flag representing through-mode Off, the CPU 321 determines the order data not to be processed in the through mode. In a case where the order data is determined to be processed in the through mode, the process proceeds to Step S614, and the color correction processing unit 326 performs the process of the through mode described above. On the other hand, in a case where the order data is determined not to be processed in the through mode, the process proceeds to Step S608.

Figure 10:
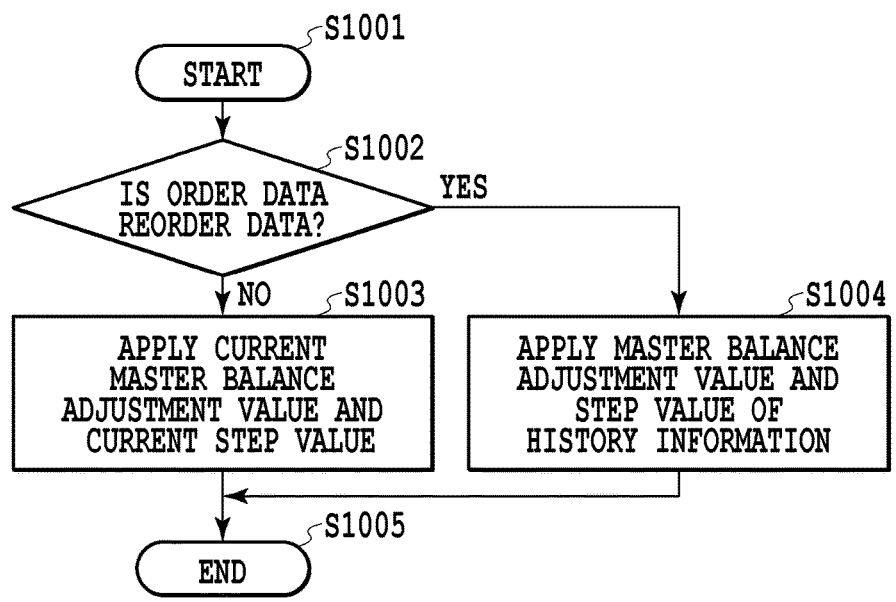
FIG. 10 is a flowchart of a color environment setting determining process according to Embodiment 1.

At Step S608, the color correction processing unit 326 determines a color environment setting used for the order data that is a test target. FIG. 10 is a detailed flowchart of a color environment setting determining process of Step S608.

At Step S1001, the color environment setting determining process is started. At Step S1002, the color correction processing unit 326 determines whether order data that is a test target is reorder data. In case of the reorder data, the process proceeds to Step S1004, and the color correction processing unit 326 applies a master balance adjustment value and a step value included in history information corresponding to the order data that is a test target, which is stored in the history folder 402, to a test process of this time. By applying the master balance adjustment value and the step value included in the history information to the test process of this time, even in a case where the current color environment setting has been changed from the time of performing the test of the previous time, an image determined at the time of performing the test of the previous time can be displayed. Accordingly, the operator can perform a test operation again while checking the image determined at the time of the test of the previous time. On the other hand, in a case where the order data that is a test target is not reorder data, the process proceeds to Step S1003, and the color correction processing unit 326 applies the current master balance adjustment value and the current step value to the test process of this time. In other words, the master balance adjustment value and the step value included in the setting information file 410 are applied to the test process of this time. At Step S1005, the process ends.

In this way, when the color environment setting determining process of Step S608 represented in FIG. 6 ends, the process proceeds to Step S609. At Step S609, the CPU 321 displays the test screen 520 on the display 311 and receives changes and the like in the values of CMYD for the image displayed on the test screen 520. When the values (UI correction values) of CMYD are changed, the CPU 321 notifies the color correction processing unit 326 of the UI correction values. The color correction processing unit 326 calculates system correction values by using the UI correction values and the color environment settings determined at Step S608 and performs a color correcting process by using the calculated system correction values. Then, the CPU 321 displays an image as a result of the correction on the test screen 520. When the click of the OK button 511 is received from the operator, the CPU 321 proceeds to Step S610 and performs post-test processing.

Figure 11:
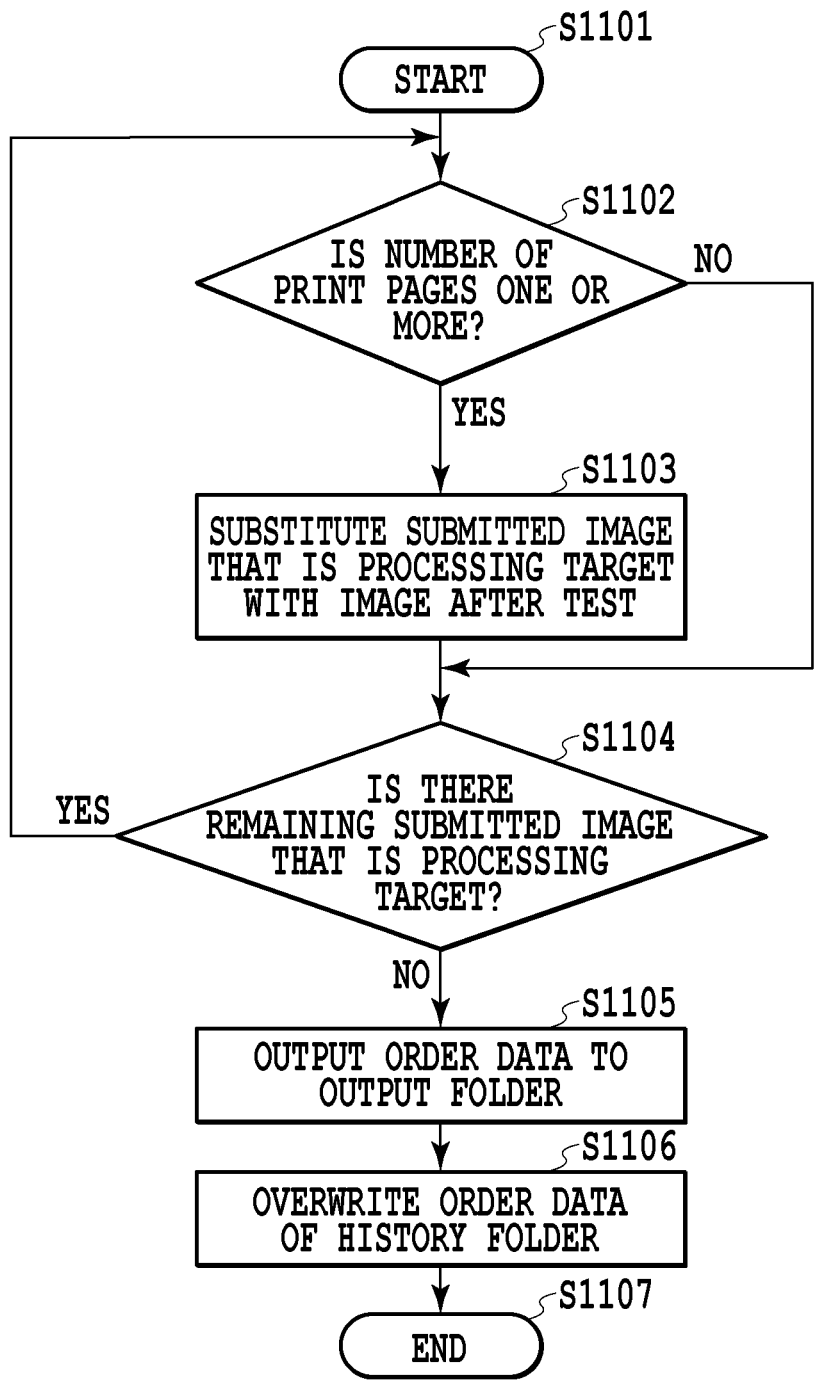
FIG. 11 is a flowchart of post-test processing used in the description of Embodiment 1.

FIG. 11 illustrates a flowchart of the post-test processing. At Step S1101, the post-test processing is started. The post-test processing is performed for each submitted image included in order data that is a test target. At Step S1102, the CPU 321 determines whether the number of print pages associated with the submitted image that is a processing target is one or more. In a case where the number of print pages is one or more, the process proceeds to Step S1103. Otherwise, the process proceeds to Step S1104. At Step S1103, the CPU 321 substitutes the submitted image that is a processing target with an image after the test for which the color correcting process has been performed. At Step S1104, the CPU 321 determines whether there is a remaining submitted image that is a processing target in the order data. In a case where there is a remaining submitted image, the process is returned to Step S1102. On the other hand, in a case where there is no remaining submitted image, the process proceeds to Step S1105.

At Step S1105, the CPU 321 outputs the order data to the output folder 430. At Step S1106, the CPU 321 outputs the content of the test of the order data in the history folder 402. In a case where the order data that is a processing target is reorder data, order data at the time of performing the test of the previous time included in the history information is overwritten.

As above, the process illustrated in FIG. 6 ends. In this embodiment, the color environment setting applied at the time of performing the test is managed as history information in association with the order data. In addition, the color environment setting applied to the order data at the time of performing a test is determined by using the history information. At the time of performing a first test, the color environment setting set in the test apparatus is applied, and, at the time of performing a retest, the color environment setting included in the history information is applied. By performing such a process, the color environment setting at the time of performing a test of the previous time can be reproduced at the time of performing a retest.

In addition, at the time of performing a retest, the UI correction values determined in the test operation of the previous time are reproduced based on the history information, and the system correction values are automatically reflected. Accordingly, at the time of performing a retest, an operator can immediately check an image of the test result at the time of performing a test of the previous time without manually setting UI correction values to the image.

Furthermore, at the time of performing a retest, the setting is returned to the color environment setting of the previous time, and it is not necessary to restart up the test apparatus, and the test process can be efficiently performed.

In the post-test process, even in a case where the process of Step S1103 is performed when the number of print pages is zero, there is no change in the effects described in this embodiment.

Figure 12:
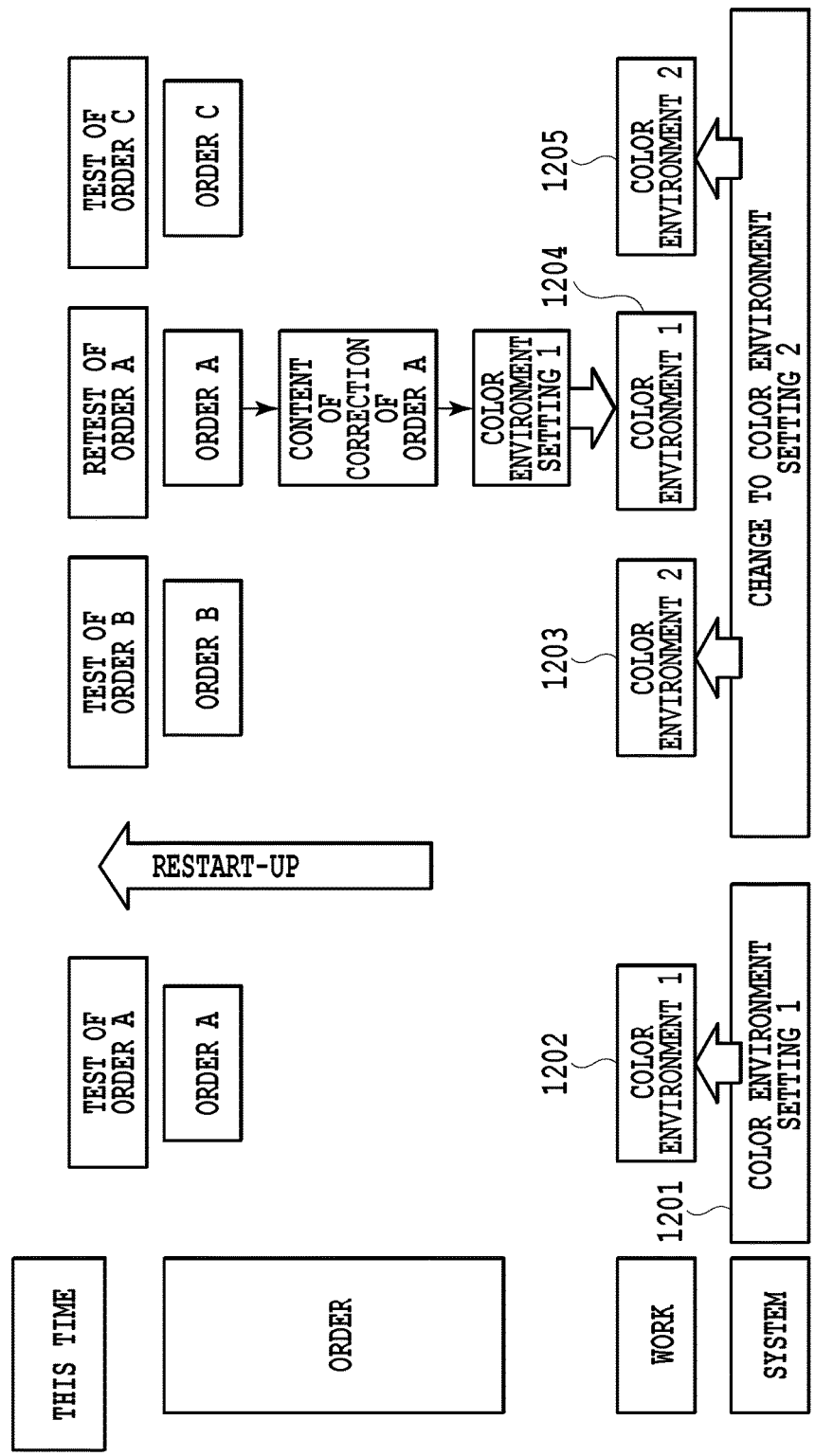
FIG. 12 is a schematic diagram that illustrates a color environment setting at the time of a retest used in the description of Embodiment 1.

FIG. 12 is a schematic diagram that illustrates a color environment setting when, after order data is tested, the test apparatus is restarted up with the color environment setting changed, and thereafter, the order data that has been tested immediately before is retested. First, when an order A is tested, a color environment setting 1 (1201) is applied to the test apparatus. Accordingly, the color environment 1 (1202) is applied to the order A. After the order A is tested, the color environment setting of the test apparatus is changed to the color environment setting 2, and the test apparatus is restarted up. Thereafter, when an order B is tested, the color environment 2 (1203) is applied to the order B. Then, when the order A that has been tested at the previous time is retested, as a result of the color environment setting determining process, the color environment 1 (1204) is applied to the order A based on the color environment setting 1 included in history information. Thereafter, when an order is tested, the current color environment 2 (1205) is applied to the order C. In this way, at the time of performing a first test, the color environment setting set in the test apparatus is applied. On the other hand, at the time of performing a retest, the color environment setting included in the history information is temporarily applied only to the reorder data.

Embodiment 2

In Embodiment 1, in a case where a retest is performed, a color environment setting included in the history information is used. Meanwhile, also in a case where a retest is performed, there are cases where it is preferable that the color environment setting of the current test apparatus is used. For example, as a use case where a retest is performed, a case or the like may be assumed in which a color correction that is appropriate on the whole is performed in a test performed at the previous time, but a fine adjustment is desired to be performed again. In a case where the color environment setting of the current system is a setting for which such a fine adjustment can be performed, it is more preferable to use the current color environment setting than to use the color environment setting included in the history information. In Embodiment 2, such a case will be described.

Figure 13:
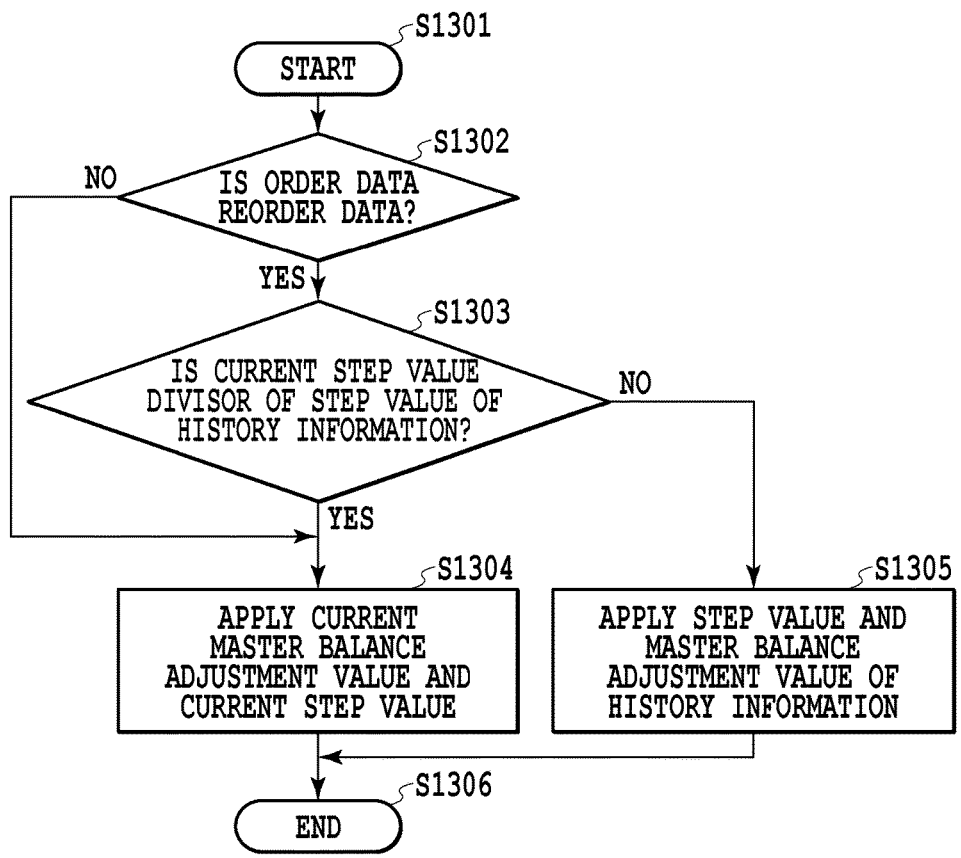
FIG. 13 is a flowchart of a color environment setting determining process according to Embodiment 2.

In Embodiment 2, a color environment setting determining process is different from that of Step S608 according to Embodiment 1. FIG. 13 is a flowchart of the color environment setting determining process according to Embodiment 2.

At Step S1301, a color correction processing unit 326 starts the color environment setting determining process. At Step S1302, the color correction processing unit 326 determines whether order data that is a test target is reorder data. In case of no reorder data, since the order data is order data of a test process of a first time, the process proceeds to Step S1304, and the color correction processing unit 326 applies a current master balance adjustment value and a current step value. On the other hand, in case of reorder data, the process proceeds to Step S1303.

At Step S1303, the color correction processing unit 326 determines whether the step value of the current test apparatus is a divisor of the step value included in history information of the reorder data. In case of a divisor, the process proceeds to Step S1304, and the color correction processing unit 326 applies the current master balance adjustment value and the current step value to the reorder data. On the other hand, in case of no divisor, the process proceeds to Step S1305, and a step value and a master balance adjustment value included in the history information of the reorder data are applied to the reorder data. At Step S1306, the color environment setting determining process ends.

In Embodiment 2 described above, in a case where the step value of the current test apparatus is a divisor of the step value included in the history information of the reorder data, the current color environment setting is applied. Accordingly, a fine adjustment at the time of performing a retest can be performed easily compared to a case where the color environment setting at the time of performing the test of the previous time is used.

Also in a case where the current color environment setting is applied to reorder data, the image represented on the test screen 520 illustrated in FIG. 5 displays an image that is tested at the previous time. The reason for this is that it is preferable for an operator to check an image tested at the previous time first and then perform a fine adjustment. At this time, in a case where the values of the current color environment setting are used as the step value and the master balance adjustment value instead of the values included in the history information, when a UI correction value included in the history information is used, the value of the system correction value is different from that at the time of performing a test of the previous time. Thus, the CPU 321 calculates a UI correction value such that the system correction value is the same as the system correction value acquired using the values included in the history information and displays the UI correction value as an initial value of the test screen 520. For example, it is assumed that, at the time of performing a test of the previous time, the UI correction value is +2, the master balance adjustment value is 0, and the step value is 10, and, in the current color environment setting at the time of performing a test of this time, the master balance adjustment value is 0 and the step value is 5. In such a case, as the UI correction value, "+4" is displayed as an initial value of the test screen. By processing as such, the operator can check an image, to which the same color correction as that of the image tested at the previous time is applied, at the time of a retest and can perform a fine adjustment at the time of performing the retest.

Embodiment 3

In Embodiment 2, in order to perform a fine adjustment, in a case where the current step value is a divisor of a step value included in the history information, the current step value is used. However, in a case where the current step value is less than the step value included in the history information, a fine adjustment can be performed. In Embodiment 3, such a process will be described.

Figure 14:
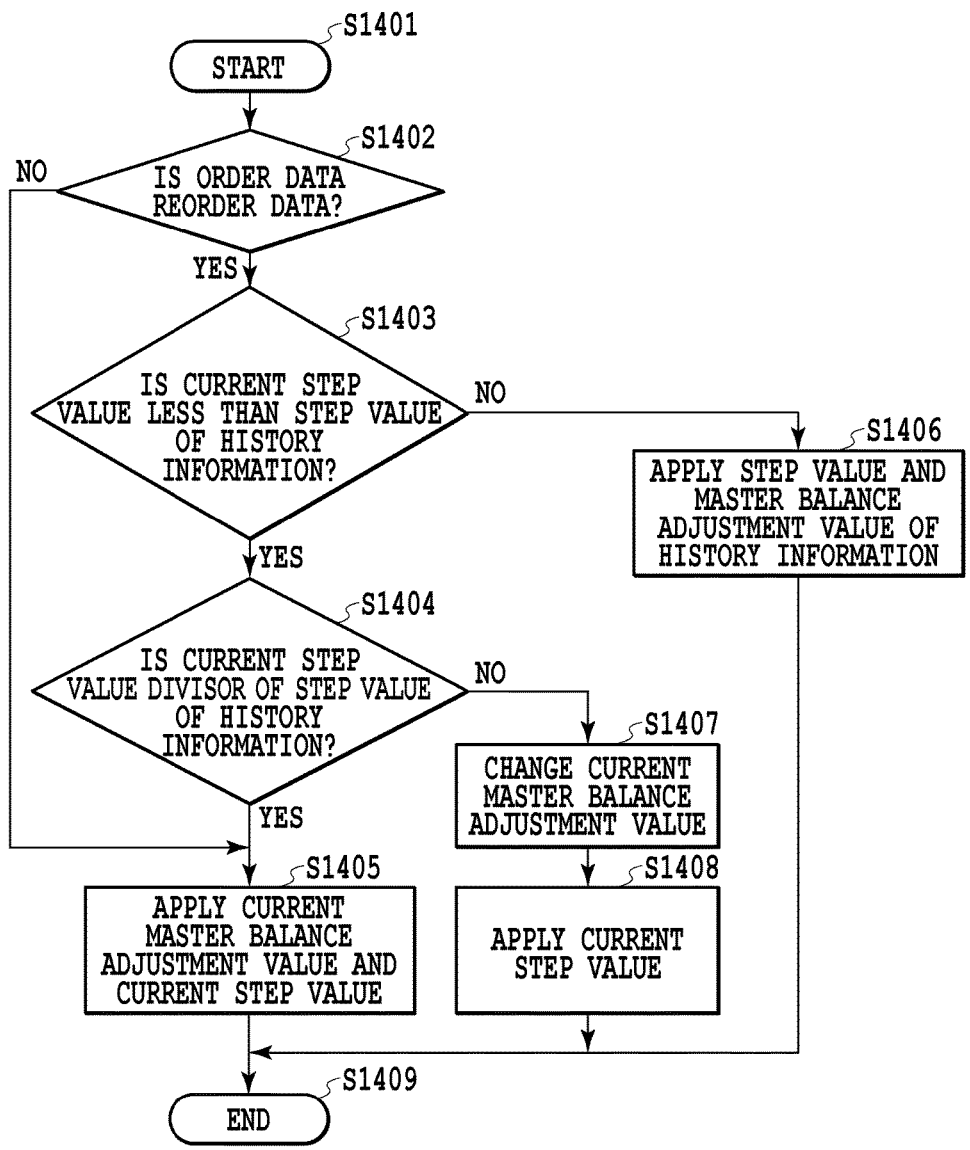
FIG. 14 is a flowchart of a color environment setting determining process according to Embodiment 3.

In the process according to Embodiment 3, a color environment setting determining process is different from that of Step S608 according to Embodiment 1. FIG. 14 is a flowchart of a color environment setting determining process according to Embodiment 3.

At Step S1401, the color environment setting determining process is started. At Step S1402, a color correction processing unit 326 determines whether order data that is a test target is reorder data. In case of no reorder data, since the order data is order data of a test process of a first time, the process proceeds to Step S1405, and a current master balance adjustment value and a current step value are applied. On the other hand, in case of reorder data, the process proceeds to Step S1403.

At Step S1403, the color correction processing unit 326 compares the step value of the current test apparatus and the step value included in the history information of the reorder data with each other. In a case where the step value included in the history information is equal to or less than the step value of the current test apparatus, the process proceeds to Step S1406, and the master balance adjustment value and the step value included in the history information are applied. On the other hand, in a case where the step value included in the history information is larger than that of the current test apparatus, the process proceeds to Step S1404.

At Step S1404, the color correction processing unit 326 determines whether the current step value is a divisor of the step value included in history information. In case of a divisor, similar to the process described in Embodiment 2, the process proceeds to Step S1405, and the current master balance adjustment value and the current step value are applied. On the other hand, in case of no divisor, the process proceeds to Step S1407, and the current master balance adjustment value is changed. Then, the changed master balance adjustment value is temporarily applied to the test process of reorder data that is a processing target. Then, the process proceeds to Step S1408, and the current step value is applied.

Figure 15A:
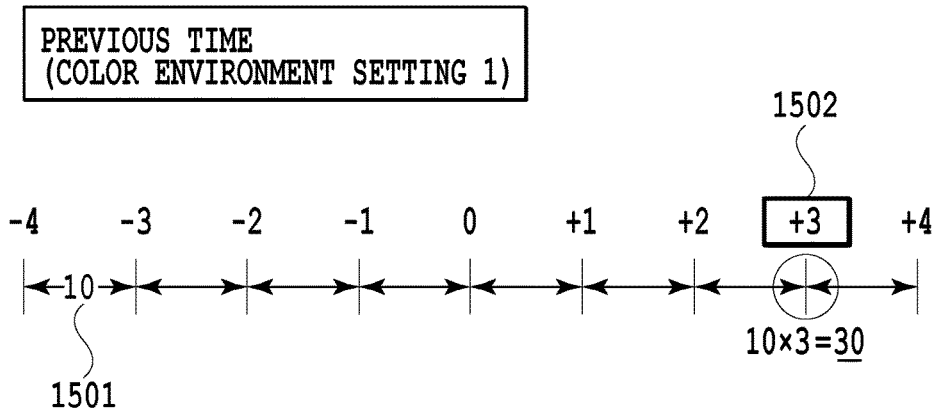
FIGS. 15A and 15B are diagrams that illustrate examples of a color environment setting used in description of Embodiment 3.

The process of Steps S1407 and S1408 will be described with reference to FIG. 15A and FIG. 15B. FIG. 15A illustrates a color environment setting at the time of performing a test of a previous time, in other words, a step value 1501 and a UI correction value 1502 included in the history information of order data. In the example illustrated in FIG. 15A, at the time of performing the test of the previous time, a UI correction value is +3, a step value is 10, and a master balance adjustment value is 0.

In such a case, a system correction value is 30 based on the following Equation (1).

System correction value=UI correction value×Step value+Master balance adjustment value (1)

This system correction value is a value used for performing a color correction at the time of performing the test of the previous time.

Figure 15B:
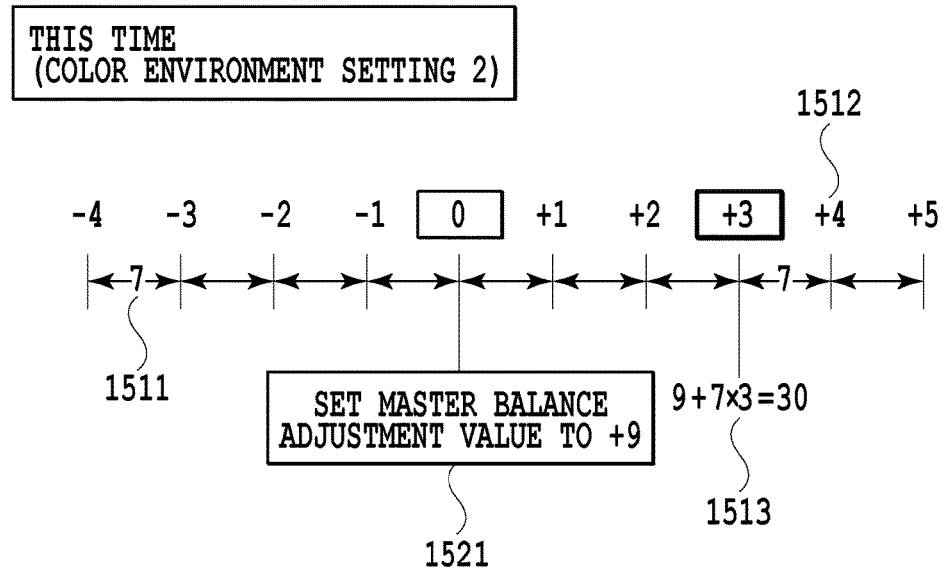

FIG. 15B illustrates a color environment setting at the time of performing a retest of this time. In the color environment setting of a retest of this time, the current step value 1511 is changed to 7, and the master balance adjustment value is changed to 0. As a UI correction value 1512 at the time of performing a retest, a same value as the UI correction value 1502 at the time of performing the test of the previous time is applied. In this example, the UI correction value is +3. However, since the current step value is 7, by applying this to the equation described above, a system correction value is 3×7+0=21 and does not coincide with 30 at the time of performing a test of the previous time. In this case, since the current step value is not a divisor of the step value included in the history information, even in a case where the UI correction value is changed, the system correction value does not coincide with the value at the time of performing the test of the previous time. Thus, in this embodiment, by changing the master balance adjustment value, the system correction values coincide with each other. In other words, in this example, the master balance adjustment value is changed to +9 (1521). As a result, the system correction value is 3×7+9=30 (1513), and the system correction value at the time of performing the test of the previous time is reproduced. The process proceeds to Step S1409, and the color environment setting determining process ends.

As above, according to this embodiment, in a case where the step value of the current color environment setting is smaller than the step value included in the history information of the reorder data, the current color environment setting is applied. In this way, a fine adjustment can be performed at the time of performing a retest. In a case where the current color environment setting is applied, when the current step value is not a divisor of the step value used at the time of performing the test of the previous time, the master balance adjustment value is adjusted. Accordingly, an image displayed on a test screen at the time of performing a retest is the same as an image on which the system correction value of the previous time is reflected. In addition, at this time, the UI correction value is the same value as that of the previous time.

Embodiment 4

In Embodiments 2 and 3, in a case where the current step value is less than the step value included in the history information, a fine adjustment can be performed, and accordingly, the current step value is used. However, as a technique for realizing a fine adjustment, a change amount of the UI correction value may be adjusted.

Figure 16:
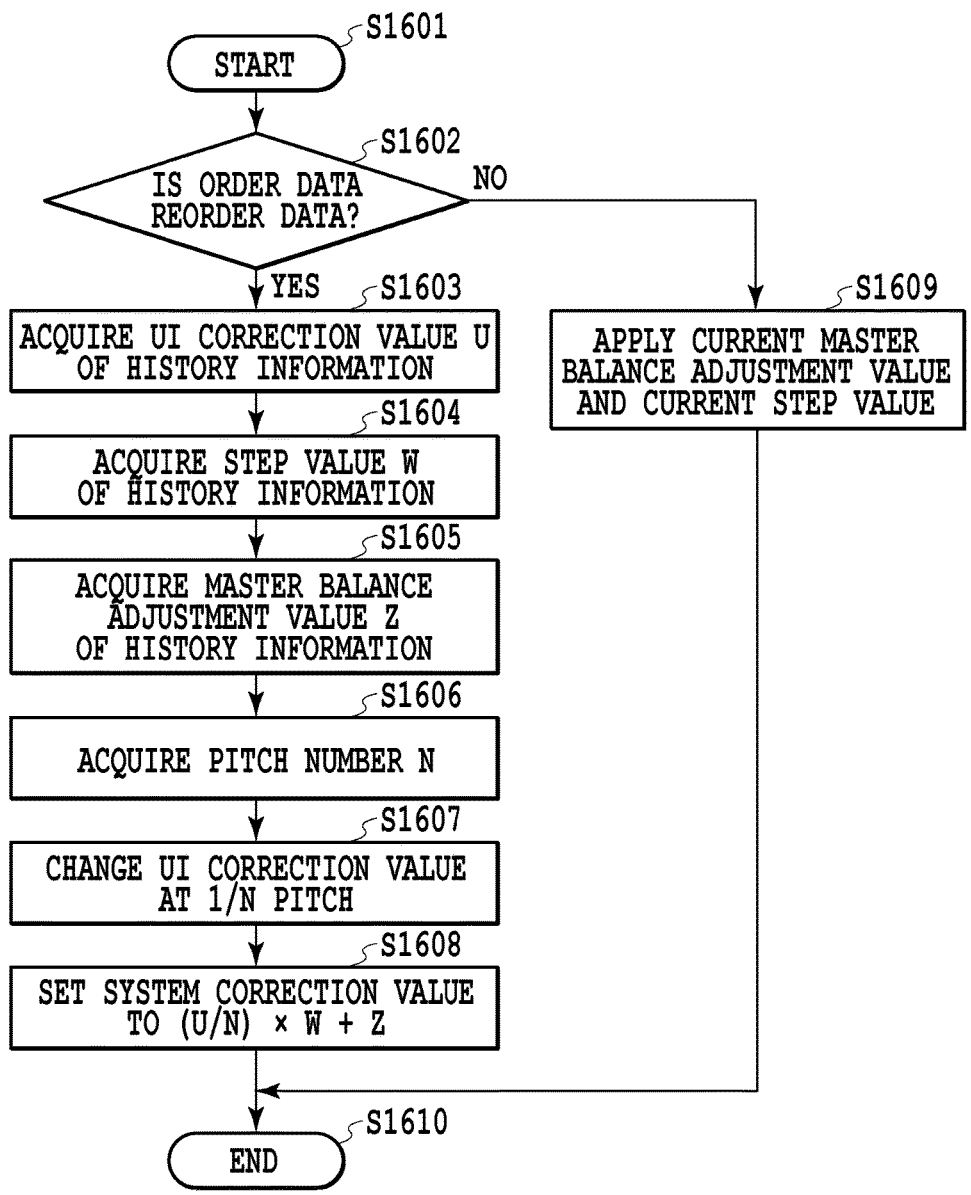
FIG. 16 is a flowchart of a color environment setting determining process according to Embodiment 4.

In the process of Embodiment 4, a color environment setting determining process is different from that of Step S608 according to Embodiment 1. FIG. 16 illustrates a flowchart of the color environment setting determining process according to Embodiment 4.

At Step S1601, the color environment setting determining process is started. At Step S1602, a color correction processing unit 326 determines whether order data that is a test target is reorder data. In case of reorder data, the process proceeds to Step S1603. On the other hand, in case of no reorder data, the process proceeds to Step S1609, and the process ends with the current master balance adjustment value and the current step value applied.

At Step S1603, the color correction processing unit 326 acquires a UI correction value U included in the history information of the reorder data. Next, at Step S1604, the color correction processing unit 326 acquires a step value W included in the history information. Next, at Step S1605, the color correction processing unit 326 acquires a master balance adjustment value Z included in the history information. Next, at Step S1606, the color correction processing unit 326 acquires a pitch coefficient N (here, N is an integer of two or more). As a method of determining the pitch coefficient N, for example, a screen used by the operator for inputting the pitch coefficient N is displayed on the test screen 520, and the pitch coefficient is determined based on operator's input to the screen.

The process proceeds to Step S1607, and the CPU 321 determines the pitch width of the UI correction value 502 displayed on the test screen 520. The pitch width of the UI correction value is 1/N.

The process proceeds to Step S1608, and the color correction processing unit 326 determines a system correction value applied as the color environment setting by using the following Equation (2).

$$\text{System correction value} = (U/N) \times W + Z \quad (2)$$

Figure 17:
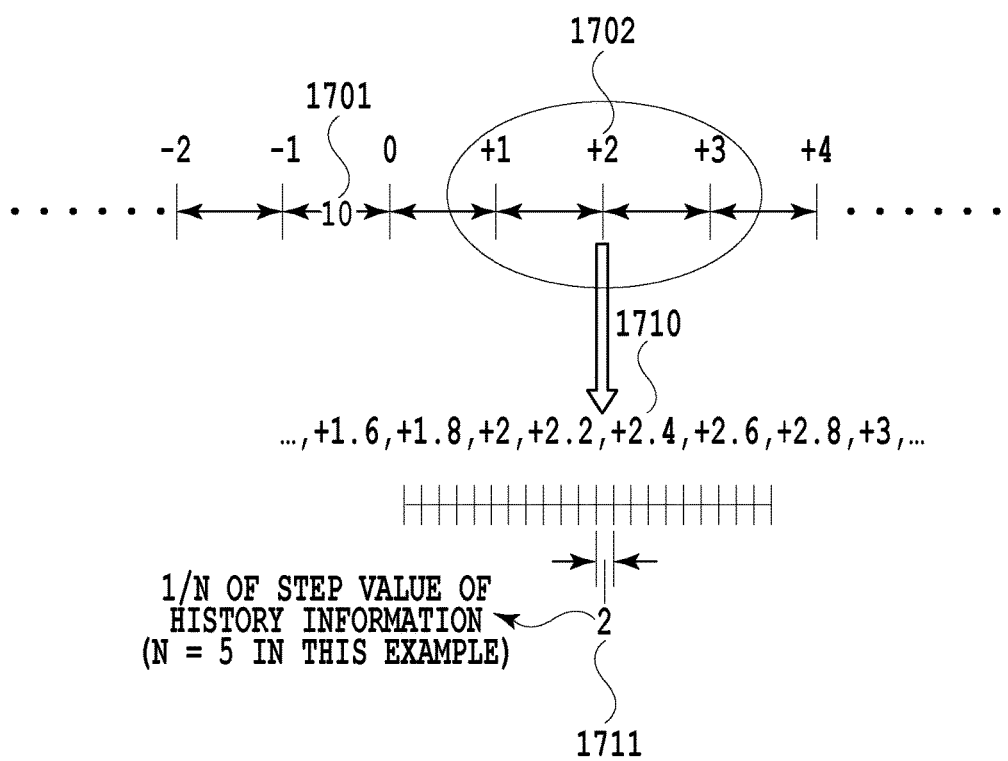
FIG. 17 is a diagram that illustrates an example of a pitch width of a UI correction value at the time of performing a retest used in description of Embodiment 4.

FIG. 17 is a diagram that illustrates an example of the pitch width of a UI correction value at the time of performing a retest according to this embodiment. A step value at the time of performing a test of a previous time is 10 (1701). A UI correction value at the time of performing the test of the previous time is +2 (1702). At the time of performing a retest, the pitch coefficient N acquired at Step S1606 is "5" (1711). In an initial state, a UI correction value displayed at the time of performing the retest is +2 that is the same as that of the previous time (1710). Since the UI correction value at the time of performing the test of the previous time is +2, it is assumed that a fine adjustment is performed near +2 at the time of performing this retest. Since the pitch coefficient N is 5, a fine adjustment of the system correction value that is five times finer than that at the time of performing the test of the previous time can be performed.

In this embodiment, while a screen for inputting a pitch coefficient N is displayed at Step S1606, and the pitch coefficient N is determined, it may be configured such that the pitch coefficient N is set in the setting information file 410, and the pitch coefficient N is determined in accordance therewith. According to this embodiment, the UI correction value displayed on the test screen at the time of performing a retest is the same value as that of the previous time.

In addition, at the time of performing a retest, a color adjustment finer than that at the time of performing the test of the previous time can be performed by adjusting the levels of the UI correction value such that the amount of change in the color correction value at the time of changing the setting of the UI correction value by one level is 1/N of that at the time of performing the test of the previous time.

In the embodiments described above, in order to manage a UI correction value and a color environment setting at the time of performing a test as a history, a UI correction value and a color environment setting at the time of performing a test of the previous time are stored. However, the present invention is not limited thereto. Thus, a UI correction value and a color environment setting at the time of performing a test before the previous time or earlier than that may be stored in association with an image that is a correction target. For example, at the time of completing the test, it may be designated by the operator whether or not the UI correction value and the color environment setting are stored as a history. In such a case, in a case where the UI correction value and the color environment setting at the time of performing the test of the previous time are not directed to be stored as a history by the operator, a UI correction value and a color environment setting at the time of a test before the previous time or earlier than that are reflected on a test of this time.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, even in a case where there is a difference between color environment settings at the time of performing a test of a previous time and at the time of performing a retest, the color environment setting at the time of performing the test of the previous time can be applied at the time of performing the retest without performing a complicated operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-202888, filed Oct. 14, 2015, which is hereby incorporated by reference wherein in its entirety.

What is claimed is:

1. A non-transitory computer readable storage medium storing a program for causing a computer to perform an image processing method for correcting an image in accordance with a correction value corresponding to a step designated by an operator, the image processing method comprising:

a first display process for displaying a screen in which the operator changes the step, in a state that a first step value is set as a step value relating to a change value of the correction value when the step is changed by one step, a first correction process for performing a first correction for the image in accordance with the correction value which is based on both of the first step value and a change of the step in the screen;

a storage process for storing the first step value used for the first correction, in a memory;

a second display process for displaying the screen again; and a second correction process for performing a second correction for the image for which the first correction has been performed, in accordance with the correction value which is based on both of the first step value stored in the memory and a change of the step in the screen displayed by the second display process, even if a second step value is set as the step value before the screen is displayed by the second display process.

2. The non-transitory computer readable storage medium according to claim 1,
wherein the screen represents the image and the step, and the step can be changed by the operator in the screen.

3. The non-transitory computer readable storage medium according to claim 2,
wherein, at the storage process, the first step value and the step designated by the operator at the first correction process and the image corrected at the first correction process are stored in the memory in association with each other, and
wherein, at the second display process, among a plurality of images stored in the memory, the image selected according to an instruction from the operator and the step associated with the image are displayed.

4. The non-transitory computer readable storage medium according to claim 3, wherein, at the second correction process, the correction is performed for the image selected according to the instruction from the operator, in accordance with the correction value which is based on both of a change of the step in the screen and the first step value stored in association with the image.

5. The non-transitory computer readable storage medium according to claim 3, wherein, at the storage process, the image corrected at the first correction process is stored in the memory.

6. The non-transitory computer readable storage medium according to claim 1,
wherein in a case where the second correction is performed for an image for which the first correction has been performed at the first correction process, the second correction for the image is performed in accordance with the correction value which is based on both of the first step value and a change of the step in the screen, and,
in a case where the second correction is performed for an image for which the first correction is not performed the second correction for the image is performed in accordance with the correction value which is based on both of the second step value and a change of the step in the screen.

7. The non-transitory computer readable storage medium according to claim 1, wherein the step designated by the operator is a step relating to a correction of at least one of cyan, magenta, yellow, and density.

8. The non-transitory computer readable storage medium according to claim 1,
wherein the first correction and the second correction are performed for the image in accordance with the correction value which is based on the step value and a change of the step in the screen and a master balance adjustment value representing a reference of correction values, and
wherein at the storage process, the first step value and a first master balance adjustment value user for the first correction are stored in the memory, and
wherein, at the second correction process, the second correction is performed for the image in accordance with the correction value which is based on the first master balance adjustment value, even if a second master balance adjustment is set as the master balance adjustment before the screen is displayed by the second display process.

9. The non-transitory computer readable storage medium according to claim 1, wherein, in a case where the second step value is less than the first step value at the second correction process, the second correction is performed based on the second step value.

10. The non-transitory computer readable storage medium according to claim 1, wherein, in a case where a second step value is less than a first step value, and the second step value is a divisor of the first step value at the second correction process, the second correction is performed based on the second step value.

11. The non-transitory computer readable storage medium according to claim 10, wherein, in a case where the second step value is less than the first step value, and the second step value is a divisor of the first step value, the display device is caused to perform display representing a second step such that a correction value based on the first step value and the step designated by the operator at the first correction process and a correction value based on the second step value and the second step are the same.

12. The non-transitory computer readable storage medium according to claim 1, wherein, at the second correction process, also in a case where a mode in which designation of a step from the operator is not accepted is set, in a case where a predetermined instruction for an image for which the first correction is performed at the first correction process is made by the operator, the second correction is performed based a step newly designated by the operator and the first step value.

13. The non-transitory computer readable storage medium according to claim 1, wherein, at the display control process, the display device is caused to display the image for which the second correction is performed and a screen, on which a step can be designated by the operator for the second correction, representing the step designated by the operator at the first correction process.

14. The non-transitory computer readable storage medium according to claim 13, wherein, at the display control process, the display device is caused to display a screen, on which a step finer than the step that can be designated at the first correction process, representing the step designated by the operator at the first correction process.

15. The non-transitory computer readable storage medium according to claim 1, wherein the image is an image for which a customer orders printing.

16. The non-transitory computer readable storage medium according to claim 6, wherein the image is an image for which a customer orders printing,
in a case where the second correction is performed for the image for which the customer orders printing and the first correction has been performed at first correction process and the customer orders printing again, the second correction for the image is performed in accordance with the correction value which is based on both of the first step value and a change of the step in the screen.

17. The non-transitory computer readable storage medium according to claim 16, further comprising:
a selection process for selecting an order from a plurality of orders for which one or more customers has ordered printing,
wherein the second correction is performed for the image for which a customer orders printing by the order selected by the selection process.

18. The non-transitory computer readable storage medium according to claim 16, further comprising:

a third display process for displaying a screen which includes information representing the plurality of orders, wherein an order is selected at the selection process, in accordance with an instruction by the operator on the screen displayed at the third display process.

19. An image processing method for correcting an image in accordance with a correction value corresponding to a step designated by an operator, the image processing method comprising:

a first display process for displaying a screen in which the operator changes the step, in a state that a first step value is set as a step value relating to a change value of the correction value when the step is changed by one step;

a first correction process for performing a first correction for the image in accordance with the correction value which is based on both of the first step value and a change of the step in the screen;

a storage process for storing the first step value used for the first correction, in a memory;

a second display process for displaying the screen again; and a second correction process for performing a second correction for the image for which the first correction has been performed, in accordance with the correction value which is based on both of the first step value stored in the memory and a change of the step in the screen displayed by the second display process, even if a second step value is set as the step value before the screen is displayed by the second display process.

20. An image processing apparatus for correcting an image in accordance with a correction value corresponding to a step designated by an operator, the image processing apparatus comprising:

at least one processor configured to execute a program, wherein the at least one processor performs:

a first display process for displaying a screen in which the operator changes the step, in a state that a first step value is set as a step value relating to a change value of the correction value when the step is changed by one step;

a first correction process for performing a first correction for the image in accordance with the correction value which is based on both of the first step value and a change of the step in the screen;

a storage process for storing the first step value used for the first correction, in a memory; and a second display process for displaying the screen again;

a second correction process for performing a second correction for the image for which the first correction has been performed, in accordance with the correction value which is based on both of the first step value stored in the memory and a change of the step in the screen displayed by the second display process, even if a second step value is set as the step value before the screen is displayed by the second display process.

* * * * *